(No Model.)

H. A. MISHLER.
DRAWING SLATE.

No. 564,211. Patented July 21, 1896.

Witnesses:
J. B. McGirr.
R. Caldwell.

Inventor
Henry A. Mishler
by Evert Appleman
atty

UNITED STATES PATENT OFFICE.

HENRY A. MISHLER, OF MECHANICSBURG, PENNSYLVANIA.

DRAWING-SLATE.

SPECIFICATION forming part of Letters Patent No. 564,211, dated July 21, 1896.

Application filed July 11, 1895. Serial No. 555,643. (No model.)

*To all whom it may concern:*

Be it known that I, HENRY A. MISHLER, a citizen of the United States of America, residing at Mechanicsburg, in the county of Cumberland and State of Pennsylvania, have invented certain new and useful Improvements in Drawing-Slates, of which the following is a specification, reference being had to the accompanying drawings.

The object of this invention is to provide a slate adapted for use in copying or tracing outlines from an original, which may consist in charts for drawing or writing, or they may contain any other of the outlines usually employed in appliances of this kind.

A further object of the invention is to provide a slate with copies which are changeable and adjustable, with means whereby a series of copies may be brought successively under the glass of the slate.

With these and other objects in view the invention consists in a frame adapted to receive a face of ground glass or the like, and mechanism whereby the copies may be brought into position, as above set forth.

With these and other objects in view the invention further consists in the novel details of construction, combination, and arrangement of parts to be hereinafter more fully set forth and claimed.

In describing the invention in detail reference is had to the accompanying drawings, forming a part of this specification, wherein like numerals indicate corresponding parts in the several views, in which—

Figure 1:
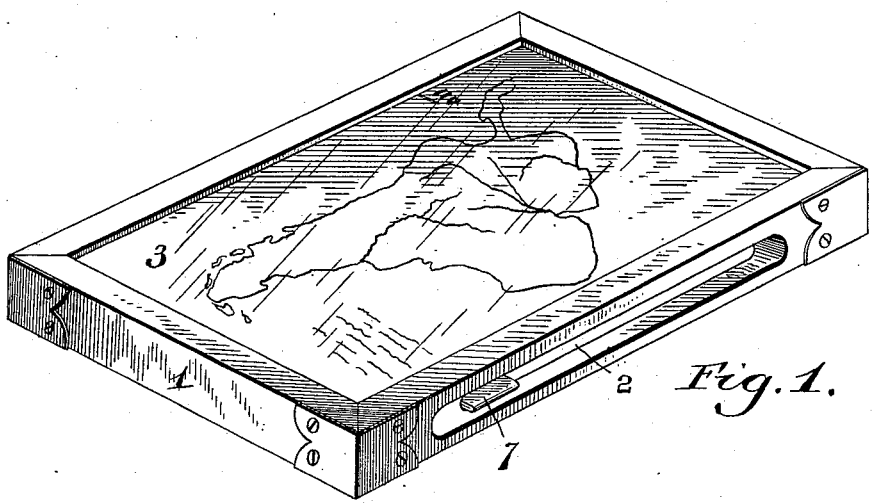
Figure 2:
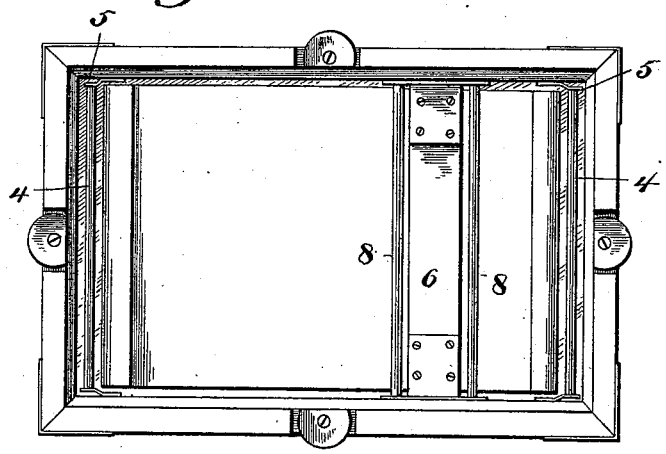
Figure 3:
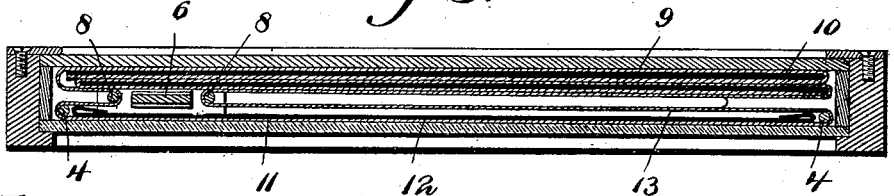

Figure 1 is a view in perspective of my improved slate. Fig. 2 is a bottom plan view. Fig. 3 is a central longitudinal vertical sectional view of Fig. 2.

In the drawings, 1 denotes a slate-frame having longitudinal slots 2 in the side thereof. This frame is adapted to receive the glass copying-surface 3 of the well-known type, and interiorly of the frame, and at the ends thereof rollers or rods 4 are mounted in suitable bearings 5.

A slide 6 is secured in the frame with the ends 7 thereof protruding through the slots 2, where it can be operated. This slide 6 has secured thereto on opposite sides rollers or stationary rods 8 8, which are adapted to move therewith.

The copy 9 is arranged on the tape or belt, to the ends of which are secured folders 10.

In adjusting the copy in the slate it is run around the end rollers or rods, so that the paper lies between the end rollers or rods and the glass, then through the rollers or rods on the slide, and then wound upon the folders. The adjustment of the copy on the tape or belt is so made that the folders will fit into the frame when the copy is properly presented to the writing-surface.

Referring to Fig. 3, 11 indicates the tape with the view exposed, and 12 is an interposed metallic plate, which holds the view against the glass. It will be seen from this that when the slide is pushed to the right the view 11 will be carried from its exposed position; that the view on the tape at 13 will be moved around to take its place, and by this operation it will be seen that the adjustment of the slide in either direction will change the view, as indicated.

Should it be desired to substitute for these views others which are on the tape or belt, the folders are removed from their position and the tape drawn in either direction until the proper subject is presented, when the latter is readjusted and the slide is then in position to present two additional views without further manipulation with the exception of the operation of the slide.

Having fully described my invention, what I claim as new, and desire to secure by Letters Patent, is—

1. A slate consisting of a frame having longitudinal slots, a transparent writing-surface, a slide carrying rollers operating in the slot, in combination with rollers or rods journaled in bearings secured to the frame and a flexible belt carrying views arranged around the rollers, substantially as described.

2. A slate consisting of a frame having longitudinal slots, on its sides, a transparent writing-surface, a slide carrying rollers operating in the slot, rollers or rods journaled in bearings secured to the frame, a strip of flexible tablet-belt containing views passing over the rollers and folders on which the belt is wound, as and for the purpose described.

In testimony whereof I affix my signature in presence of two witnesses.

HENRY A. MISHLER.

Witnesses:
ELI MUMMA,
CHRISTIAN A. GLEIM.